United States Patent [19]

Swoboda

[11] Patent Number: 5,138,547
[45] Date of Patent: Aug. 11, 1992

[54] DUAL INPUT POWER SUPPLY

[76] Inventor: Jack Swoboda, 2722 Stoner Ave., Los Angeles, Calif. 90064

[21] Appl. No.: 517,767

[22] Filed: May 2, 1990

[51] Int. Cl.$^5$ .............................................. H02M 7/04
[52] U.S. Cl. ..................................... 363/143; 363/53; 361/190
[58] Field of Search .................... 363/142, 143, 53, 61, 363/126, 89; 323/299, 300; 361/170, 187, 189, 190

[56] References Cited

U.S. PATENT DOCUMENTS

| | | | |
|---|---|---|---|
| 4,590,546 | 5/1986 | Maile | 363/37 |
| 4,780,805 | 10/1988 | Chewuk et al. | 363/142 |
| 4,845,607 | 7/1989 | Nakao et al. | 363/143 |

*Primary Examiner*—Peter S. Wong

[57] ABSTRACT

A simplified dual input power supply of the type which automatically responds to either a low level AC supply voltage (e.g. 115 volts) or a high level AC supply voltage (e.g. 230 volts) to provide a single level DC output voltage (e.g. 300 volts). The power supply switches between a voltage doubler operation and a full-wave rectifier operation dependent upon the level of the AC supply voltage. For a low level AC supply voltage an energizing circuit is completed to a relay, or the like, which switches in the voltage doubler circuit configuration. For a high level AC supply voltage, a Zener diode circuit conducts and breaks the energizing circuit to de-energize the relay so as to switch in the full-wave rectifier configuration. A protective circuit is provided to prevent the power supply from switching back to its low input voltage mode less the input voltage drops below a predetermined level for a predetermined time interval.

6 Claims, 1 Drawing Sheet

DUAL INPUT POWER SUPPLY

BACKGROUND OF THE INVENTION

The present invention is directed to a dual input power supply which is similar to the power supply described in U.S. Pat. No. 4,780,805, but which features a more straight-forward and simpler circuit. The power supply disclosed in U.S. Pat. No. 4,780,805 maintains a substantially constant output voltage when the power supply is connected to either a low or high level of AC voltage input. This type of power supply has particular utility with electronic equipment, such as computers, which are designed for use in more than one facility where different levels of alternating current power are provided. The most common levels encountered are 115 volts and 230 volts AC. The equipment energized by the power supply requires that the DC voltage of the power supply be maintained at a substantially constant level regardless of whether the input AC voltage is 115 volts or 230 volts. The most commonly used prior art method for achieving the foregoing is to switch the power supply from a full-wave rectifier operation to a voltage doubler operation. Various techniques have been used in the past to accomplish such switching, including the approach described in U.S. Pat. No. 4,780,805.

As mentioned above, an objective of the present invention is to provide an improved dual input power supply of the type described above, which is simpler and more straight-forward than the power supplies of the prior art, and yet which accomplishes its desired functions in an improved and reliable manner.

The system described in U.S. Pat. No. 4,780,805 provides for the automatic configuration of a power supply by switching between either a voltage doubler or full-wave rectifier operating mode in response to the level of the AC input voltage, and the system described in the patent additionally provides a circuit configuration which locks the power supply into the full-wave rectifier operating mode once it has been switched to that mode and prevents the circuit from switching out of the full-wave rectifier operating mode in the presence of a subsequent low level input voltage so as to prevent damage to the equipment.

However, the protective circuit described in U.S. Pat. No. 4,780,805 is somewhat complex, and an additional objective of the present invention is to provide a simplified protective circuit which, after the power supply has been conditioned to the full-wave rectifier mode of operation, cannot be switched back to the voltage doubler mode of operation, unless the AC input voltage drops to a relatively low value for an appreciable time interval.

SUMMARY OF THE INVENTION

A simplified dual input power supply is provided of the type which automatically responds to either a low level AC supply voltage (e.g. 115 volts) or a high level AC supply voltage (e.g. 230 volts) to generate a single level DC output voltage (e.g. 300 volts). The power supply of the invention switches between a voltage doubler configuration and a full-wave rectifier configuration dependent on the level of the AC supply voltage. For a low level AC supply voltage an energizing circuit is completed to a relay to energize the relay and causes it to switch in the voltage doubler configuration. For a high level AC supply voltage, a Zener diode circuit conducts and breaks the relay energizing circuit to de-energize the relay and cause it to switch in the full-wave rectifier configuration. A protective circuit is provided to prevent the power supply from switching back to its low input voltage mode unless the input voltage drops below a predetermined level for an appreciable time interval.

DETAILED DESCRIPTION OF THE ILLUSTRATED EMBODIMENT

Figure 1:
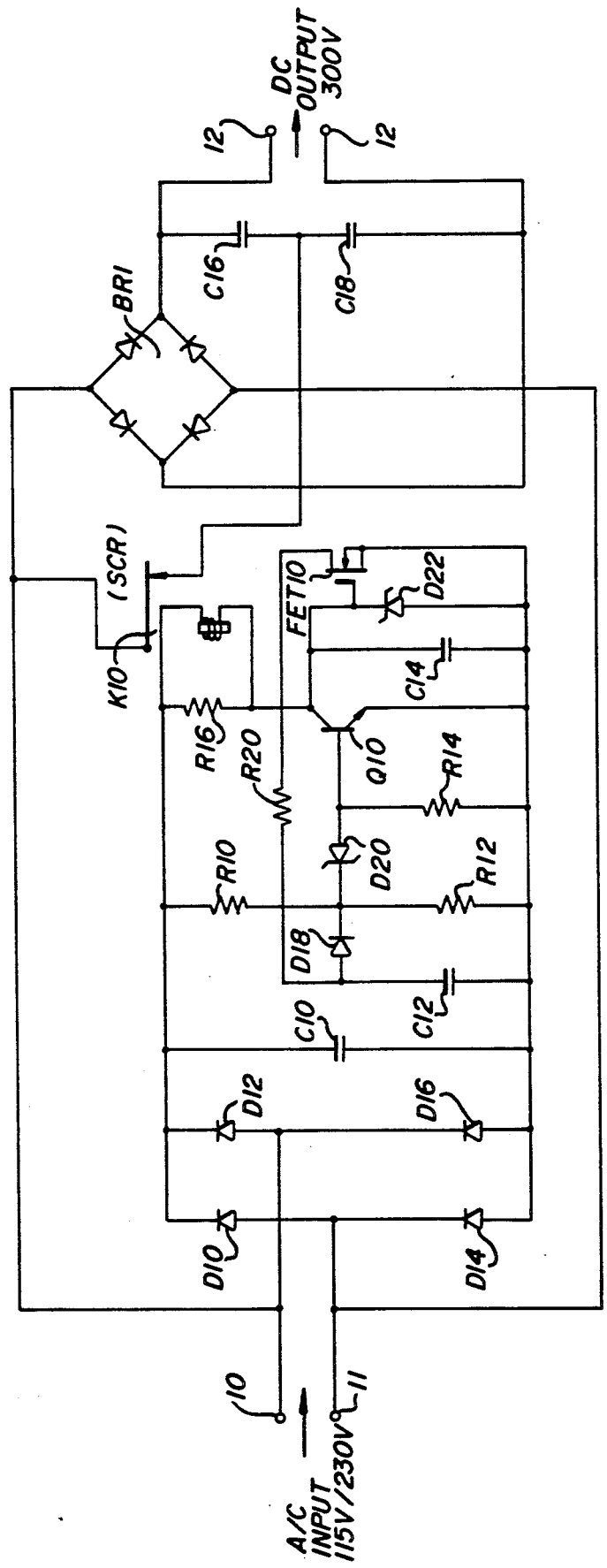
FIG. 1 is a circuit diagram of a power supply respresenting one embodiment of the invention.

The power supply shown in FIG. 1 includes a pair of input terminals 10, 11. The input terminals are connected to a full-wave rectifier bridge made up of four diodes D10, D12, D14 and D16, each of which may be of the type designated IN4937. Diodes D10 and D12 are connected to a positive lead designated (+), and diodes D14 and D16 are connected to ground. A filter capacitor C10 is connected across the full-wave rectifier, and it may have a value of 10 microfarads. A voltage divider made up of resistors R10 and R12 is connected across capacitor C10. Resistor R10 may have a resistance of 330 kilo-ohms and resistor R12 may have a resistance of 15 kilo-ohms. The junction of resistors R10 and R12 is connected through a Zener diode D20 to the base of an NPN transistor Q10. Diode D20 may have be of the type designated IN754 and the transistor may be of the type designated 2N2222.

The anode of Zener diode D20 is connected to a grounded resistor R14 of a value of 2.7 kilo-ohms. The emitter of transistor Q10 is grounded, and the collector is onnected to the positive lead designated "+" through a resistor R16 of 330 kilo-ohms. The energizing coil of a normally-open relay K10 is connected between lead "+" and a grounded Field Effect Transistor FET 10 which may be of the type designated IRF 831. The collector of transistor Q10 is also connected to FET 10, as shown, and to a grounded capacitor C14 and a grounded Zener Diode D22. The Zener Diode may be of the type designated IN759, and the capacitor C14 may have a capacity of 0.15 microfarads.

A protective circuit is provided which includes a 330 kilo-ohm resistor R20, a grounded capacitor C12 of 0.33 microfarads, and a diode D18 which connects the capacitor C12 to the junction of resistors R10 and R12. Diode D18 may be of the type designated IN4148. Resistor R20 is connected to the energizing coil of relay K10.

The input terminals 10, 11 are also connected to a rectifier bridge BR1, which, in turn, is connected to output terminals 12. The output terminals are shunted by a pair of capacitors C16 and C18. The relay K10 selectively connects the common junction of the capacitors C16 and C18 to the lead that connects input terminal 10 to the bridge BR1.

When the relay K10 is de-energized, so that its contacts are open, the bridge BR1 acts as a full-wave rectifier. During such an operational mode, when the AC input voltage is at the 230 volt level, the DC output voltage is at the 300 volt level. However, when the AC input voltage is at the 115 volt level, the relay K10 is energized, and it closes to connect the junction of capacitors C16 and C18 to the lead from input terminal 10. For such a configuration, the bridge BR1 acts as a voltage doubler. Then, when the 115 volt AC voltage is applied to input terminals 10, the DC output voltage across output terminals 12 remains at the 300 volt level.

When the AC input voltage applied to input terminals 10, 11 is at the 115 volt level, Zener diode D20 is non-conductive, and transistor Q10 is also non-conductive, and FET10 is conductive to complete a path for the energizing coil of relay K10 to ground. The relay is now energized to close its contacts, and the bridge BR1 is connected to capacitors C16 and C18 in a voltage doubler configuration. Accordingly, and as explained above, for the 115 volt AC input, the relay K10 is energized, the bridge BR1 is in its voltage doubler configuration, and the DC output voltage appearing across output terminals 12 is 300 volts.

Now, should the 230 volt AC input voltage be applied to input terminals 10, the voltage at the junction of resistors R10 and R12, which are connected as a voltage divider across the rectifier circuit of diodes D10, D12, D14 and D16, is such that Zener diode D20 conducts. This causes transistor Q10 to become conductive, which in turn causes FET10 to be switched off. When the FET10 is switched off, the energizing circuit to the energizing coil of relay K10 is broken, and the relay is de-energized, opening its contacts. The bridge BR1 now functions as a full-wave rectifier and, accordingly, the 230 volt AC input voltage applied across input terminals 10 causes a DC output voltage across output terminals 12 to remain at 300 volts.

It is apparent that relay K10 could be an SCR, or any other type of controlled switch.

When the 230 volt AC input voltage is applied to the input terminals 10, causing relay K10 to be de-energized, and causing bridge BR1 to assume the full-wave rectifier configuration, the power supply will remain in that configuration even if the AC input voltage drops momentarily. This is to prevent the power supply from inadvertently being switched to the voltage doubler configuration for relatively high input voltages, which could cause the DC output voltage to rise with possible damage to the equipment.

Accordingly, the protective circuit formed by resistor R20, capacitor C12 and diode D18 is provided. When the power supply is in its high input voltage configuration, FET10 is open, and capacitor C12 is charged through resistor R20 to a relatively high level. Then, should the AC input voltage be reduced, the power supply itself will not switch back to the voltage doubler configuration, until the input voltage has been sufficiently reduced to a relatively low level, and until an appreciable time interval has passed, at which time capacitor C12 will discharge sufficiently to permit Zener diode D20 to become non-conductive, and FET10 again to close, energizing the relay K10 and re-establishing the voltage doubler mode.

The invention provides, therefore, a simple and straight-forward dual input power supply which provides a constant level DC output in the presence of high level or low level AC input voltages. The power supply also includes a simple and straight-forward protective circuit, which prevents the generation of high output voltages due to the power supply being inadvertently switched to the voltage doubler mode before the AC input voltage has been reduced to its low level.

While a particular embodiment of the invention has been shown and described, modifications may be made. It is intended in the claims to cover all modifications which come within the spirit and scope of the invention.

I claim:

1. In a power supply adapted to respond to either a low level AC supply voltage or a high level AC supply voltage to produce a single level DC output voltage and which comprises input terminal means for receiving the high level and low level AC supply voltages; and output circuit means connected to said input terminal means and having a first state in which the output circuit means is connect as a voltage doubler circuit and having a second state in which the output circuit means is connected as a full-wave rectifier; a control circuit connected to said input terminal means, said control circuit including: rectifier circuit means connected to said input terminal means for rectifying the AC supply voltage applied thereto and for producing a DC voltage of a level corresponding to the level of the AC supply voltage applied to said input terminal means, relay switching means connected to said output circuit means for switching said output circuit means to its first state when said relay switching means is energized and for switching said output circuit means to its second state when said relay switching means is de-energized, and control circuitry including a Zener Diode and a transistor connecting said relay switching means to said rectifier circuit means for establishing an energizing circuit to said relay switching means when the low level AC supply voltage is applied to the input terminal means and when said Zener Diode and said transistor are non-conductive, and for breaking the energizing circuit to said relay switching means when the high level AC supply voltage is applied to said input terminal means and the DC voltage produced by said rectifier circuit means exceeds a first predetermined level and when said Zener Diode and said transistor are conductive.

2. The control circuit defined in claim 1, and which includes a protective circuit included in said control circuitry for resetting the energizing circuit to said relay switching means only when the DC voltage produced by said rectifier circuit means drops to a further predetermined level less than said first predetermined level and for a predetermined time interval.

3. The control circuit defined in claim 1, in which said control circuitry includes a switch included in the energizing circuit to said relay switching means, and said transistor is connected to said switch to close said switch when said DC voltage produced by said rectifier circuit means is less than said first predetermined level, and to open said switch when said DC voltage produced by said rectifier circuit means exceeds said first predetermined level.

4. The control circuit defined in claim 3, in which said switch comprises a field effect transistor.

5. The control circuit defined in claim 1, in which said rectifier circuit means includes a voltage divider connected to said Zener diode.

6. The control circuit defined in claim 5, in which said protective circuit includes a resistance capacitance network and a diode connecting said resistance capacitance network to said voltage divider.

* * * * *